United States Patent
Yang

(10) Patent No.: US 6,750,851 B2
(45) Date of Patent: Jun. 15, 2004

(54) MULTI-PURPOSE RADIO T/R SYSTEM

(76) Inventor: Tai-Her Yang, 6F-5 No. 250, Sec. 4, Chung Hsiao E. Rd., Taipei (TW)

(*) Notice: Subject to any disclaimer, the term of this patent is extended or adjusted under 35 U.S.C. 154(b) by 111 days.

(21) Appl. No.: 09/940,893

(22) Filed: Aug. 29, 2001

(65) Prior Publication Data

US 2003/0036353 A1 Feb. 20, 2003

(51) Int. Cl.$^7$ .................................................. H04Q 7/32
(52) U.S. Cl. .................. 345/169; 345/157; 345/168; 341/22; 307/19; 307/43; 307/48; 320/114; 320/128; 361/686; 361/680; 361/681; 379/428; 379/433; 455/90; 455/575
(58) Field of Search ................................ 345/157, 168, 345/169; 307/19, 43, 48; 320/114, 128; 341/22; 361/680, 681, 686; 379/428, 433; 455/90, 575

(56) References Cited

U.S. PATENT DOCUMENTS

| | | | | |
|---|---|---|---|---|
| 5,732,348 A | * | 3/1998 | Norimatsu | 455/434 |
| 5,956,655 A | * | 9/1999 | Suzuki et al. | 455/566 |
| 6,075,345 A | * | 6/2000 | Lee | 320/138 |
| 6,184,804 B1 | * | 2/2001 | Harrison | 341/22 |
| 6,288,973 B1 | * | 9/2001 | Joynes | 367/118 |

* cited by examiner

Primary Examiner—Bipin Shalwala
Assistant Examiner—Vincent E. Kovalick
(74) Attorney, Agent, or Firm—Bacon & Thomas, PLLC

(57) ABSTRACT

A multi-purpose radio transmission/reception (T/R) system includes a radio peripheral (PH200) and a multi-purpose transmission/reception device (H100) for executing one-way radio reception or two-way radio transmission/reception by infrared or RF or ultrasonic. The characteristic of this system is that the radio peripheral (PH200) and multi-purpose transmission/reception device (H100), as required, can be converted to a wired mouse, track ball or touch panel, and may function as a wired mouse, track ball or touch panel in case of insufficient power, power failure, channel interference or radio transmission/reception failure. The device can optionally include multiple interface connectors (or plug-socket units) to connect to each other and to connect both the multi-purpose radio transmission/reception (T/R) system and its matching radio peripheral, or transmission wire for electric energy or both signal and electric energy transmissions: as an option, the radio peripheral (PH200) and multi-purpose transmission/reception device (H100) further can be installed individually or be combined for storage and used separately.

15 Claims, 10 Drawing Sheets

MULTI-PURPOSE RADIO T/R SYSTEM

BACKGROUND OF THE INVENTION (a) Field of the Invention

The present invention relates to a multiple purpose radio transmission and receiving system, and more particularly, to one that incorporates associate mechanism and circuits of a wired mouse, a track ball or a touch panel and provided with switches, I/O connector (or plug-socket unit), transmission wire and an optional charging control circuit and a (dis) chargeable battery.

(b) Description of the Prior Art

A dedicated or a common radio transmission/receiving system is usually required to be adapted to the conventional hand-held or desk-top radio keyboard or radio mouse, track ball, touch panel, scanner, camera, Aido-Visual (AV) display or TV game operator, Remote Control (RC) and other radio peripheral that executes radio transmission by infra-red or radio frequency, then connected to a main frame via transmission wire or interface connector (or plug-socket unit).

SUMMARY OF THE INVENTION

The primary purpose of the present invention is to provide a radio peripheral matching multi-purpose radio transmission (T/C) system via RF, infra-red or ultra-sonic transmission that also functions as a wired mouse, a track ball or a touch panel in case of power insufficiency, power failure or channel interference. The system contains a structure that permits mutual combination between both of the system and its matching radio peripheral said multi-purpose radio (T/R) system, an interface connector (or plug-socket unit) for mutual connection, or a transmission wire to transmit electric energy or signal or both.

DETAILED DESCRIPTION OF THE PREFERRED EMBODIMENTS

Figure 1:
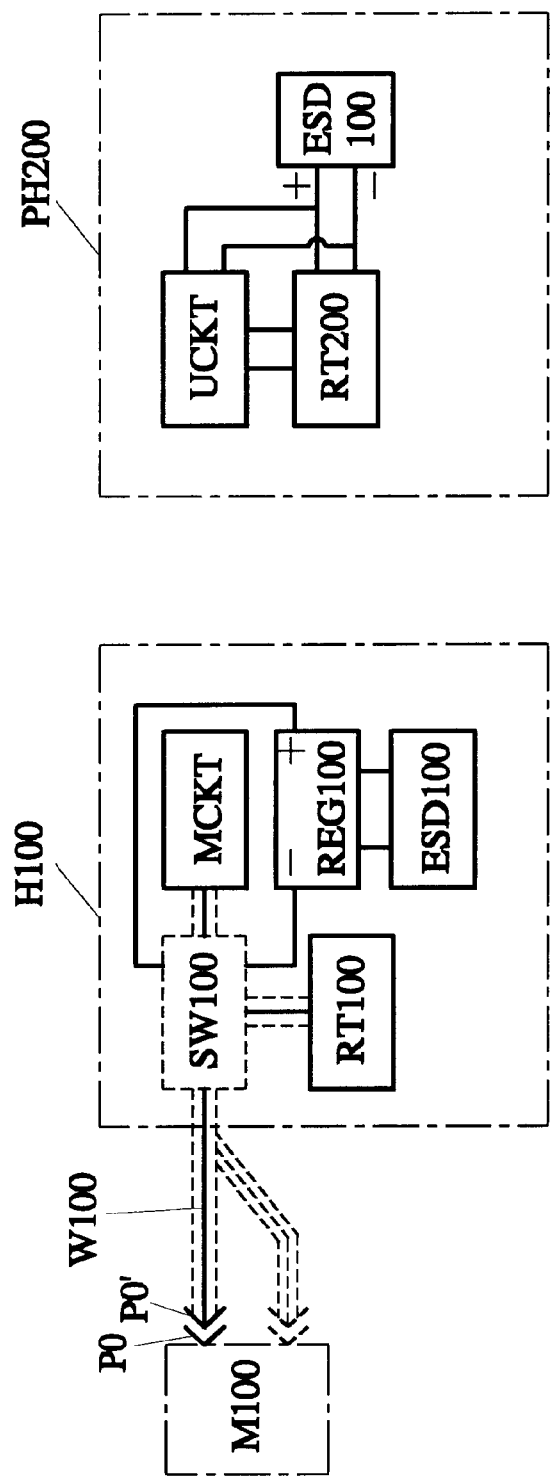
FIG. 1 is a schematic view showing a basic circuit structure of the present invention.

A multi-purpose radio T/R system of the present invention is to disclose a radio T/R system incorporated with wired mouse, track ball or touch panel related mechanisms and circuits, provided with switches and I/O interface connector (or plug-socket unit), and optional charging control circuit and (dis) chargeable battery device. The system receives signals from radio peripheral via infrared or RF, or super sonic transmission, or executes basic functions of having two-way T/R interaction with radio peripheral. Furthermore, (1) The system contains interface connectors (or plug-socket units) respectively provided on both of the system and its matching radio peripheral for transmission, or transmission wire having at both ends an interface connector (or plug-socket unit) to transmit electric energy or signals or both; or (2) provides a charging set to accommodate (dis) chargeable battery, or interface connector (or plug-socket unit) to be charged by DC source and charging control circuit from the multi-purpose radio T/R system is provided to the multi-purpose radio T/R system functioning also as a wire mouse, track ball or touch panel; (3) a co-structure to combine the multi-purpose radio T/R system and its matching wired mouse, track ball, or touch panel with SERIAL, PS2, USB, IEEE1394 or other specified interface connector (or plug-socket unit) provided between the system and said peripheral to the mainframe, or said peripheral may be removed for the system to operate independently; or (4) both of the system and its matching peripheral are made in an appropriate structure to facilitate portability and storage; or (5) the system is in a structure adaptable to a wired mouse, track ball, or touch panel features and radio peripheral. As a result, the system provides the following or part of the following features:

(A) a multi-purpose structure comprised of a one-way radio receiving or two-way radio T/R infrared, RF or ultra-sonic transmission circuit RT100, wired mouse, track ball or touch panel related mechanisms and circuits, and switch to form an integrated multi-purpose radio T/R system H100 for transmission of message to a radio peripheral PH200 by means of infra-red, RF or ultra-sonic; and may be further provided with interface connector (or plug-socket unit) and an electric energy transmission wire W200 to connect to the radio peripheral PH200 and the integrated multi-purpose radio T/R system H100 for executing wired operation to the radio peripheral PH200, and functioning as an intermediate transmission of signals or simultaneous transmission of electric energy and signals;

(B) an integrated multi-purpose radio T/R system H100, comprised of the one-way radio receiving or two-way radio T/R infrared, RF or ultrasonic transmission circuit RT100, wired mouse, track ball or touch panel related mechanisms and circuits, switches, charging control circuit REG100, and (dis)chargeable battery ESD100 either directly connected to the system or indirectly coupled to the system by means of a charging unit or interface connector (or plug-socket unit) to execute message transmission via infrared or RD, or ultrasonic to the radio peripheral PH200;

(C) An integrated multi-purpose radio T/R system H100, comprised of the one-way radio receiving or two-way radio T/R infrared, RF or ultrasonic transmission circuit RT100, wired mouse, track ball or touch panel related mechanisms and circuits, switches, charging control circuit REG100, and (dis)chargeable battery ESD100 either directly connected to the system or indirectly coupled to the system by means of a charging unit or interface connector (or plug-socket unit) to execute message transmission via infrared or Received Data (RD), or ultrasonic to the radio peripheral PH200; said integrated multi-purpose radio system H100 is supplied with the charging control circuit REG100 and the I/O interface connector (or plug-socket unit) to supply power to the radio peripheral PH200 via the electric energy transmission wire W200, and to charge the (dis)chargeable battery ESD100 provided inside the radio peripheral PH200;

(D) An integrated multi-purpose radio T/R system H100, comprised of the one-way radio receiving or two-way radio T/R infrared, RF or ultrasonic transmission circuit RT100, wired mouse, track ball or touch panel related mechanisms and circuits, switches, charging control circuit REG100, and (dis)chargeable battery ESD100 either directly connected to the system or indirectly coupled to the system by means of a charging unit or interface connector (or plug-socket unit) to execute message transmission via infrared or RF, or ultrasonic to the radio peripheral PH200, the charging control circuit REG100 is provided within the integrated multi-purpose T/R system H100, and the dis (chargeable) battery ESD100 is directly connected to the system, or indirectly coupled to the system via the charging unit or the interface connector (or the plug-socket unit); in addition to one-way receiving signals from the radio peripheral PH200, or executing infrared or RF or ultrasonic transmission of two-way signals transmission and reception, the multi-purpose radio T/R system H100 is also capable of charging the inherited dis(chargeable) battery ESD100 from the source of the wired mouse, track ball or touch panel through the charging control circuit REG100; furthermore, an additional interface connector (or plug-socket unit) P10 is directly or through the electric energy transmission wire W200 connected to an interface connector (or plug-socket unit) P10' from the radio peripheral PH200 so to charge the (dis)chargeable battery ESD100 provided in the radio peripheral PH200; or a signal and electric energy transmission wire W300 is provided to incorporate both interface connectors (or the plug-socket units) P10, P10' respectively from the radio peripheral PH200 and the integrated multi-purpose radio T/R system H100 to execute electric energy or signal transmission;

(E) In a first configuration of a combined multi-purpose radio T/R system H100', a wired mouse, track ball or touch panel provided with the charging control circuit REG100 and the (dis)chargeable battery ESD100 is connect to a radio T/R system H100''' by means of SERIALPS2USBIEEE1394 or any other interface connector (or plug-socket unit) of selected specification 00''' to form a combined multi-purpose radio T/R system H100'; in addition to executing one-way radio reception of signals from the radio peripheral PH200, or infrared, RF or ultrasonic transmission of two-way signal T/R, the radio T/R system H100''' is capable of supplying power of the mainframe M100 connected to it to the wired mouse, track ball or touch panel related mechanisms and circuits MCKT by operation of a switch SW101, or supplying power to the radio T/R system H100''' itself, and supplying power to charge its inherited (dis)chargeable battery ESD100 via the charging control circuit REG100 provided in the wired mouse, track ball or touch panel; said radio T/R system H100''', in addition to being combined to a combination socket S100 of the wired mouse, track ball or touch panel, can be removed for direct connection to the mainframe and operate with the matching peripheral PH200, or as an option, the combination socket S100 is provided in the radio peripheral PH200 to be connected to the radio T/R system H100''' for the combination of said radio T/R system H100''' and the multi-purpose radio T/R system H100' to facilitate storage and portability; furthermore, the combined multi-purpose radio T/R system H100' and the radio peripheral PH200 can be directly connected or indirectly connected by means of the electric energy transmission wire W200, so to charge the (dis)chargeable battery provided in the radio peripheral PH200; or a signal and electric energy transmission wire W300 is used to incorporate the radio peripheral PH200 and the interface connector (or the plug-socket unit) from the combined multi-purpose radio T/R system H100' to execute electric energy and signal transmission; or to incorporate an interface connector (or plug-socket unit) P0 from the mainframe M100 and the interface connector (or the plug-socket unit) P10' from the radio peripheral PH200 to execute electric energy or signal transmission;

(F) In a second configuration of the combined multi-purpose radio T/R system H100', a SERIAL, PS2, USB, IEEE1394 or any other interface connector (or plug-socket unit) of selected specification is used to connect a wired mouse, track ball or touch panel provided with charging control circuit and (dis) chargeable battery, to a radio T/R system H100'''' provided with the charging control circuit REG100 and the (dis)chargeable battery ESD100 to form a combined multi-purpose radio T/R system H100'; in addition to executing one-way reception of signals from the radio peripheral PH200, or infrared, RF or ultrasonic transmission of two-way signals T/R, said radio T/R system H100'''' containing the charging control circuit REG100 and the (dis)chargeable battery ESD100 combined with the multi-purpose radio T/R system H100' can supply power from the source of the mainframe connected to the wired mouse, track ball, or touch panel to the wired mouse, track ball, or touch panel related mechanisms and circuits MCKT via a switch SW101, or supply power to the radio T/R system H100''''; and to charge its inherited (dis)chargeable battery ESD100 by means of the charging control circuit REG100 provided in the wired mouse, track ball or touch panel; or to charge its inherited (dis)chargeable battery ESD100 through the inherited charging control circuit REG100; the radio T/R system H100'''', in addition to being combined with the combination socket S100 of the wired mouse, track ball, or touch panel, can be removed for direct connection to the mainframe, and operation with the matching radio peripheral PH200, or, as an option, the combination socket S100 can be provided with the radio peripheral PH200 for combination with the radio T/R system H100'''', and thus for the combination of the radio peripheral PH200 and the radio T/R system H100'''' to facilitate storage and portability; furthermore, the charging control circuit of the radio T/R system H100'''' or the charging control circuit REG100 provided with the wired mouse, track ball or touch panel may be provided as the case may be, and by the operation of the switch SW101, either or both of said charging control circuits REG100 maybe charged separately or simultaneously; the combined multi-purpose radio T/R system H100' and the radio peripheral PH200 may directly or via the electric energy transmission wire W200 charge the (dis) chargeable battery ESD100 in the radio peripheral PH200, or the signal and electric energy transmission wire W300 is used to incorporate the interface connector (or the plug-socket unit) provided between the radio peripheral PH200 and the combined multi-purpose radio T/R system H100' to execute electric energy and signal transmission; or to incorporate between the interface connector (or the plug-socket unit) P0 between P0 of the mainframe M100 and the interface connector (or the plug-socket unit) P10' of the radio peripheral PH200 to execute electric energy or signal transmission;

(G) In a third configuration of the combined multi-purpose radio T/R system H100', a SERIAL, PS2, USB, IEEE1394 or any other interface connector (or plug-socket unit) of selected specification is used to connect a wired mouse, track ball or touch panel provided with charging control circuit and (dis) chargeable battery, to a radio T/R system H100''' provided with the charging control circuit REG100 and the (dis)chargeable battery ESD100 to form a combined multi-purpose radio T/R system H100'; in addition to executing one-way reception of signals from the radio peripheral PH200, or infrared, RF or ultrasonic transmission of two-way signals T/R, said radio T/R system H100''' containing the charging control circuit REG100 and the (dis)chargeable battery ESD100 combined with the multi-purpose radio T/R system H100' can supply power from the source of the mainframe connected to the wired mouse, track ball, or touch panel to the wired mouse, track ball, or touch panel related mechanisms and circuits MCKT via the switch SW101, or supply power to the radio T/R system H100'''; and to charge its inherited (dis)chargeable battery ESD100 by means of the charging control circuit REG100 provided in the wired mouse, track ball or touch panel; or to charge its inherited (dis)chargeable battery ESD100 through the inherited charging control circuit REG100; the radio T/R system H100''', in addition to being combined with the combination socket S100 of the wired mouse, track ball, or touch panel, can be removed for direct connection to the mainframe, and operation with the matching radio peripheral PH200, or, as an option, the combination socket S100 can be provided with the radio peripheral PH200 for combination with the radio T/R system H100''', and thus for the combination of the radio peripheral PH200 and the radio T/R system H100''' to facilitate storage and portability; furthermore, the charging control circuit of the radio T/R system H100''' or the charging control circuit REG100 provided with the wired mouse, track ball or touch panel may be provided as the case may be, and by the operation of the switch SW101, either or both of said charging control circuits REG100 may be charged separately or simultaneously; the combined multi-purpose radio T/R system H100' and the radio peripheral PH200 may directly or via the electric energy transmission wire W200 charge the (dis)chargeable battery ESD100 in the radio peripheral PH200, or the signal and electric energy transmission wire W300 is used to incorporate the interface connector (or the plug-socket unit) provided between the radio peripheral PH200 and the combined multi-purpose radio T/R system H100' to execute electric energy and signal transmission; or to incorporate between the interface connector (or the plug-socket unit) P0 between P0 of the mainframe M100 and the interface connector (or the plug-socket unit) P10' of the radio peripheral PH200 to execute electric energy or signal transmission;

(H) In a fourth configuration of the combined multi-purpose radio T/R system H100', a SERIAL, PS2, USB, IEEE1394 or any other interface connector (or plug-socket unit) of selected specification is used to connect a wired mouse, track ball or touch panel provided with charging control circuit and (dis) chargeable battery, to a radio T/R system H100'''' provided with the charging control circuit REG100 and the (dis)chargeable battery ESD100 to form a combined multi-purpose radio T/R system H100'; in addition to executing one-way reception of signals from the radio peripheral PH200, or infrared, RF or ultrasonic transmission of two-way signals T/R, said radio T/R system H100'''' containing the charging control circuit REG100 and the (dis)chargeable battery ESD100 combined with the multi-purpose radio T/R system H100' can supply power from the source of the mainframe connected to the wired mouse, track ball, or touch panel to the wired mouse, track ball, or touch panel related mechanisms and circuits MCKT via the switch SW101, or supply power to the radio T/R system H100''''; and to charge its inherited (dis)chargeable battery ESD100 by means of the charging control circuit REG100 provided in the wired mouse, track ball or touch panel; or to charge its inherited (dis)chargeable battery ESD100 through the inherited charging control circuit REG100; the radio T/R system H100'''', in addition to being combined with the combination socket S100 of the wired mouse, track ball, or touch panel, can be removed for direct connection to the mainframe, and operation with the matching radio peripheral PH200, or, as an option, the combination socket S100 can be provided with the radio peripheral PH200 for combination with the radio T/R system H100'''', and thus for the combination of the radio peripheral PH200 and the radio T/R system H100'''' to facilitate storage and portability; furthermore, the charging control circuit of the radio T/R system H100'''' or the charging control circuit REG100 provided with the wired mouse, track ball or touch panel may be provided as the case may be, and by the operation of the switch SW101, either or both of said charging control circuits REG100 may be charged separately or simultaneously; the combined multi-purpose radio T/R system H100' and the radio peripheral PH200 may directly or via the electric energy transmission wire W200 charge the (dis) chargeable battery ESD100 in the radio peripheral PH200, or the signal and electric energy transmission wire W300 is used to incorporate the interface connector (or the plug-socket unit) provided between the radio peripheral PH200 and the combined multi-purpose radio T/R system H100' to execute electric energy and signal transmission; or to incorporate between the interface connector (or the plug-socket unit) P0 between P0 of the mainframe M100 and the interface connector (or the plug-socket unit) P10' of the radio peripheral PH200 to execute electric energy or signal transmission.

Referring to FIG. 1, a preferred embodiment of the circuit of the multi-purpose radio T/R system of the present invention is essentially comprised of:

a mainframe M100: containing a computer host, a monitor or notebook, or information electric home appliance or other electric appliance, provided with one or more than one interface connector (or plug-socket unit) P0 to be coupled to one or more than one interface connector (or plug-socket unit) P0' corresponding to a transmission wire W100 from an integrated multi-purpose radio T/R system H100 for transmission of electric energy and signals; and said interface connector (or plug-socket unit) P0 or P0' is comprised of SERIAL PS2 USB IEEE1394 or any other connector (or plug-socket unit) of selected specification;

an integrated multi-purpose radio T/R system H100: comprised of a manually operated wired mouse, track ball or touch panel related mechanisms and circuits MCKT, an infrared or RF or ultrasonic transmission circuit RT100 to execute one-way radio reception or two-way radio T/R, an optional switch SW100 depending on the nature of the transmission interface to switch said wired mouse, track ball, or touch panel related mechanisms and circuits MCKT to the transmission wire W100, or to switch infrared, RF or ultrasonic transmission circuit RT100 of one-way radio reception or two-way T/R to the transmission wire W100; said transmission wire W100 can be comprised of conductive transmission wire or transmission wire blended with optical fiber for one or more than one interface connector (or plug-socket unit) P0' to be coupled to one or more than one corresponding interface connector (or plug-socket unit) P0 from the main unit M100; said infrared, RF, or ultrasonic transmission circuit RT100 of one-way radio reception or two-way T/R is to execute message transmission to the radio peripheral PH200 via infrared, RF or ultrasonic, so to receive signals transmitted one or more than one radio peripheral PH200 of one type or more than one type, or to execute two-way T/R from or to one or more than one radio peripheral PH200 of one type or more than one type;

a charging control circuit REG100: comprised of charging related electro-mechanical electronic device, provided in the integrated multi-purpose radio T/R system H100, or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the integrated multi-purpose radio T/R system H100, or in the wired mouse, track ball, or touch panel to be combined with the multi-purpose radio T/R system; said (dis)chargeable battery ESD100 is also an optional device;

a radio peripheral PH200: comprised of a radio peripheral to execute infrared, RF or ultrasonic transmission, containing the (dis)chargeable battery ESD100, the radio peripheral PH200 dedicated interface circuit UCKT, one-way radio transmission or two-way radio T/R infrared, RT or supersonic transmission circuit RT200; in addition to providing one-way radio transmission or two-way T/R interaction, an additional circuit may be provided to the radio peripheral PH200 for connection to the integrated multi-purpose radio T/R system H100 by a transmission wire to execute wired signal output or input and output, or electric energy transmission; said radio peripheral PH200 contains a radio keyboard, hand-held trackball, hand-held operator, radio mouse, or radio scanner, radio camera, radio AV display, radio TV game operator, radio RC or any other radio peripheral.

Figure 2:
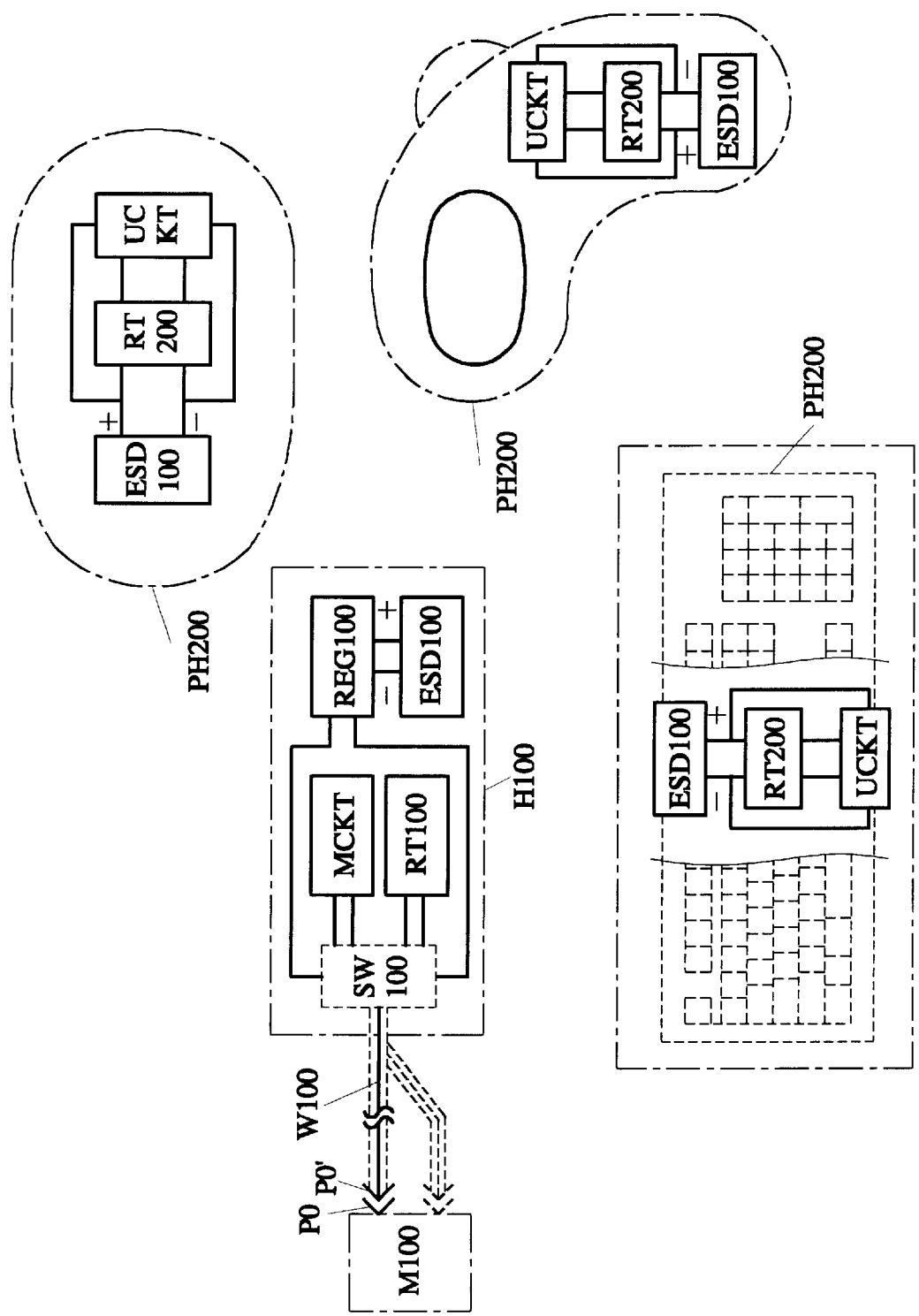
FIG. 2 is a schematic view showing a circuit of the present invention matching multiple sets of radio peripherals.
Figure 3:
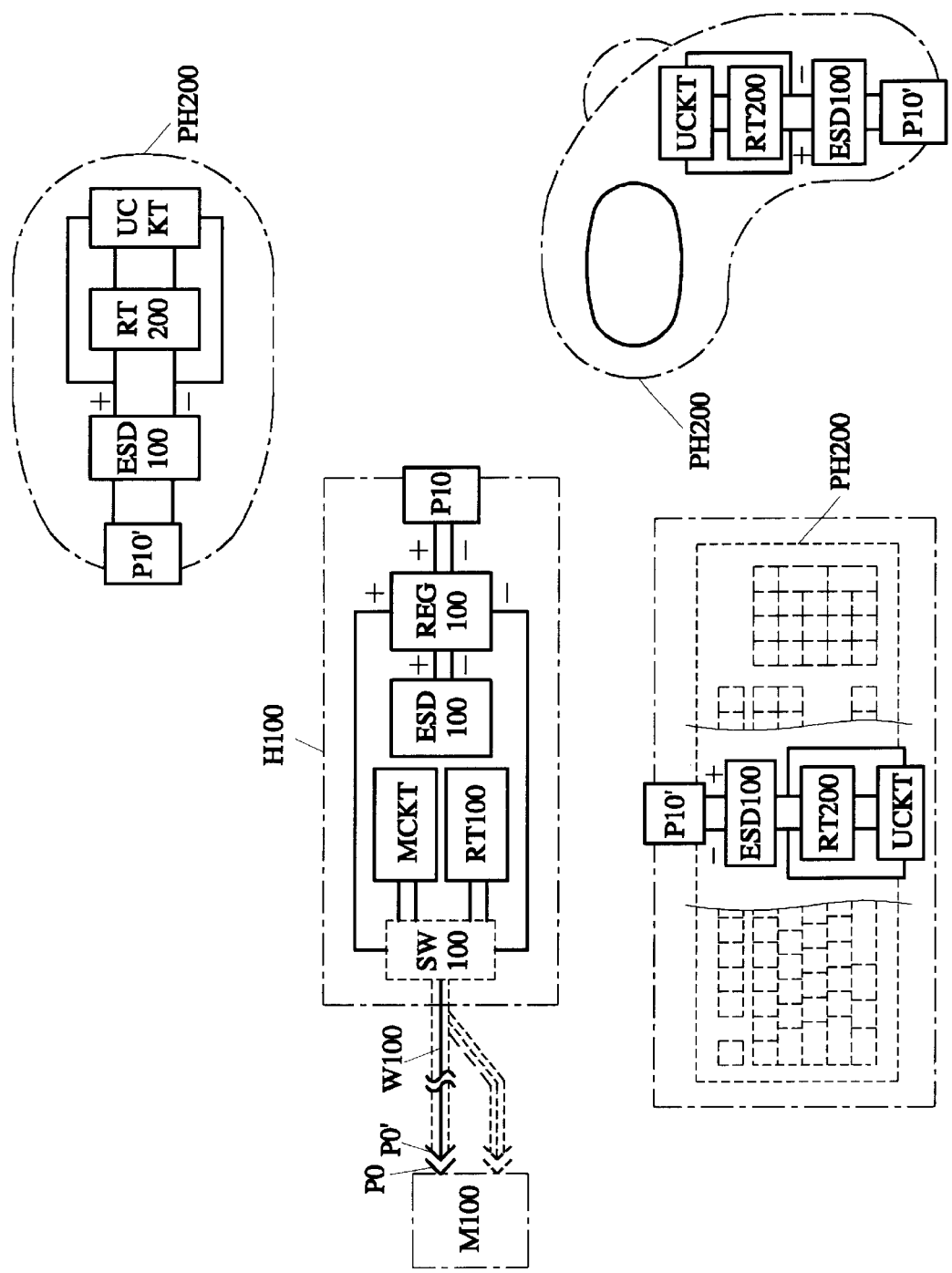
FIG. 3 is a schematic view showing a circuit of the present invention and its matching radio peripheral containing a source I/O interface connector (or a plug-socket unit).

FIG. 2 shows a schematic view of a circuit of the multi-purpose radio T/R system of the present invention and its matching radio peripheral, essentially comprised of:

an integrated multi-purpose radio T/R system H100 also functioning as a wired mouse, to match one or more than one radio peripheral PH200 of desk-top or hand-held infrared, RT or supersonic radio transmission; said radio peripheral PH200 contains a radio keyboard, hand-held track ball, hand-held operator, radio mouse, or radio scanner, radio camera, radio AV display, radio TV game operator, radio RC or any other radio peripheral;

a charging control circuit REG100: comprised of charging related electro-mechanical electronic device, provided in the integrated multi-purpose radio T/R system H100, or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the integrated multi-purpose radio T/R system H100, or in the wired mouse, track ball, or touch panel to be combined with the multi-purpose radio T/R system; said (dis)chargeable battery ESD100 is also an optional device;

As illustrated in FIG. 3, one or more than one electric energy and signal transmission interface connector (or plug-socket unit) P10 is provided in said multi-purpose radio system H100, wherein, a circuit of the multi-purpose radio T/R system and its matched radio peripheral are each provided with an electric energy and signal transmission interface connector (or plug-socket unit), essentially comprised of:

a mainframe M100: containing a computer host, a monitor or notebook, or information electric home appliance or other electric appliance, provided with one or more than one interface connector (or plug-socket unit) P0 to be coupled to one or more than one interface connector (or plug-socket unit) P0' corresponding to a transmission wire W100 from an integrated multi-purpose radio T/R system H101 for transmission of electric energy and signals; and said interface connector (or plug-socket unit) P0 or P0' is comprised of SERIAL PS2 USB IEEE1394 or any other connector (or plug-socket unit) of selected specification;

an integrated multi-purpose radio T/R system H100 comprised of a manually operated wired mouse, track ball or touch panel related mechanisms and circuits MCKT, an infrared or RF or ultrasonic transmission circuit RT100 to execute one-way radio reception or two-way radio T/R, an optional switch SW100 depending on the nature of the transmission interface to switch said wired mouse, track ball, or touch panel related mechanisms and circuits MCKT to the transmission wire W100, or to switch infrared, RF or ultrasonic transmission circuit RT100 of one-way radio reception or two-way T/R to the transmission wire W100; said transmission wire W100 can be comprised of conductive transmission wire or transmission wire blended with optical fiber for one or more than one interface connector (or connector (or plug-socket unit) P0' to be coupled to one or more than one corresponding interface connector (or plug-socket unit) PO from the main unit M100; said infrared, RF, or ultrasonic transmission circuit RT100 of one-way radio reception or two-way T/R is to execute message transmission to the radio peripheral PH200 via infrared, RF or ultrasonic, so to receive signals transmitted one or more than one radio peripheral PH200 of one type or more than one type, or to execute two-way T/R from or to one or more than one radio peripheral PH200 of one type or more than one type;

a charging control circuit REG100: comprised of charging related electro-mechanical electronic device, provided in the integrated multi-purpose radio T/R system H100, or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the integrated multi-purpose radio T/R system H100, or in the wired mouse, track ball, or touch panel to be combined with the multi-purpose radio T/R system; said (dis)chargeable battery ESD100 is also an optional device;

a radio peripheral PH200: comprised of infrared, RF, or ultrasonic radio transmission peripheral characterized by that an interface connector (or plug-socket unit) P10' provided in the radio peripheral PH200 for electric energy or both electric energy and signal transmission connects internally to the (dis)chargeable battery ESD100 and externally coupled to another electric energy or both of electric energy and signal transmission interface connector (or plug-socket unit) P10 provided in the integrated multi-purpose radio T/R system depending on their corresponding polarities to execute transmission of electric energy; a DC source from the mainframe M100 being subject to regulation and control by the charging control circuit REG100 provided inside the integrated multi-purpose radio T/R system H100, is further connected by the electric energy or both of electric energy and signal transmission interface connectors (or plug-socket units) P10 and P10' provided between said system H100 and said peripheral PH200, to output to the (dis)chargeable battery ESD100 in the radio peripheral PH200 voltage and amperage required by said (dis)chargeable battery ESD100, and to execute charging status display as required by the matching (dis)chargeable battery ESD100; and said radio peripheral PH200 is comprised of a radio keyboard, hand-held track ball, hand-held operator, radio mouse, or radio scanner, radio camera, radio AV display, radio TV game operator, radio RC or any other radio peripheral.

Figure 4:
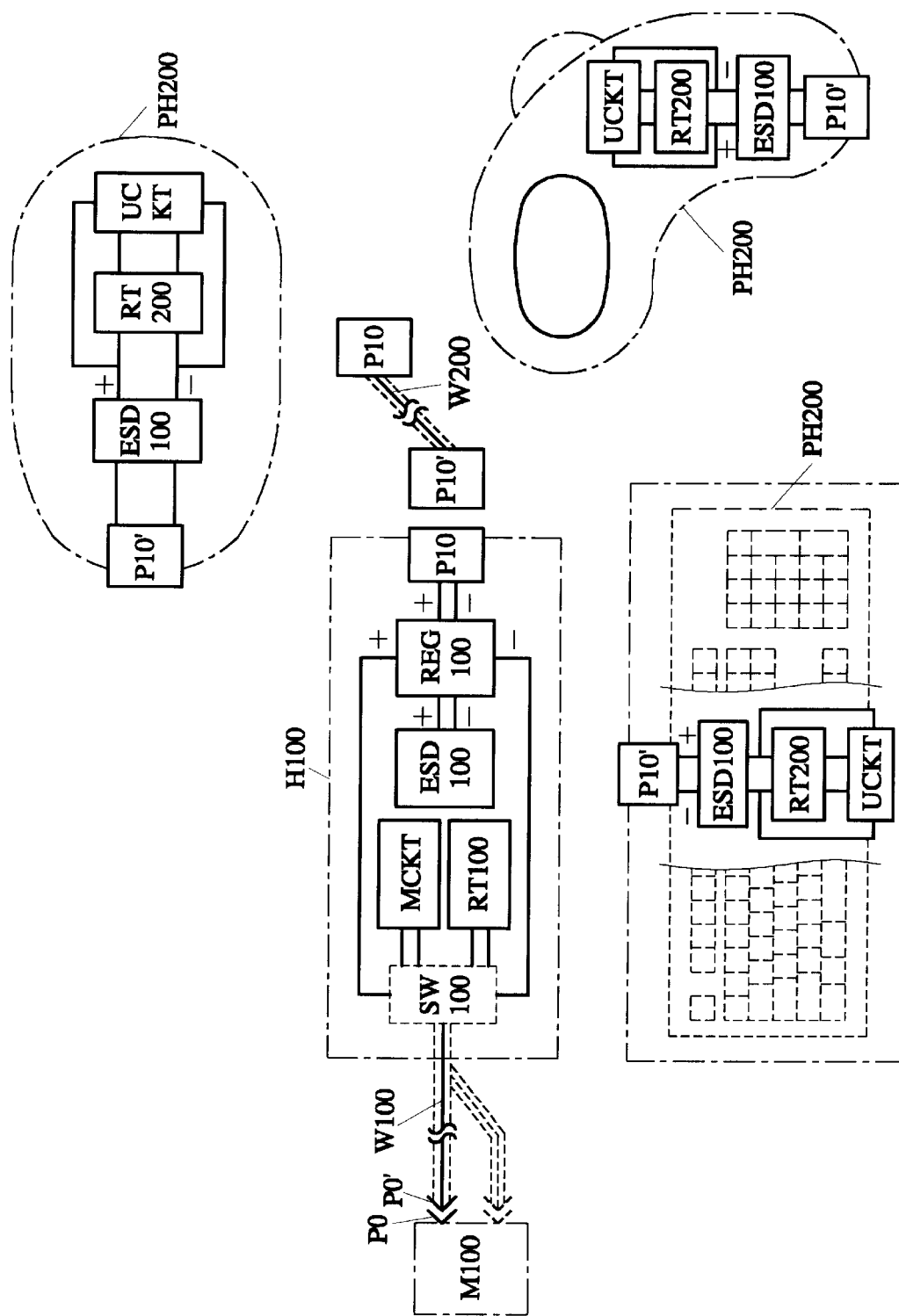
FIG. 4 is a schematic view showing a circuit in FIG. 3 having an electric energy transmission wire provided between the interface connectors of the present invention and its matching radio peripheral.

As illustrated in FIG. 4, an intermediate transmission wire W200 is further provided between the electric energy transmission structures of said electric energy or both electric energy and signal transmission interface connectors (or plug-socket units) P10 and P10' respectively provided in the integrated multi-purpose radio T/R system H100 and the peripheral PH200 so that the radio peripheral PH200 maintains its operation while the integrated multi-purpose radio T/R system H100 is executing electric energy transmission to the radio peripheral PH200; FIG. 4 shows a circuit of having an additional electric energy transmission wire provided between said two interface connectors (or plug-socket units) from the multi-purpose radio T/R system and its matching radio peripheral of a preferred embodiment of the present invention illustrated in FIG. 3, essentially comprised of:

a DC source from the mainframe M100 being subject to regulation and control by the charging control circuit REG100 provided inside the integrated multi-purpose radio T/R system H100, is further connected by the electric energy or both of electric energy and signal transmission interface connectors (or plug-socket units) P10 and P10' provided between said system H100 and said peripheral PH200, to output to the (dis)chargeable battery ESD100 in the radio peripheral PH200 voltage and amperage required by said (dis)chargeable battery ESD100, and to execute charging status display as required by the matching (dis)chargeable battery ESD100;

a charging control circuit REG100: comprised of charging related electro-mechanical electronic device, provided in the integrated multi-purpose radio T/R system H100, or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the integrated multi-purpose radio T/R system H100, or in the wired mouse, track ball, or touch panel to be combined with the multi-purpose radio T/R system; said (dis)chargeable battery ESD100 is also an optional device.

Figure 5:
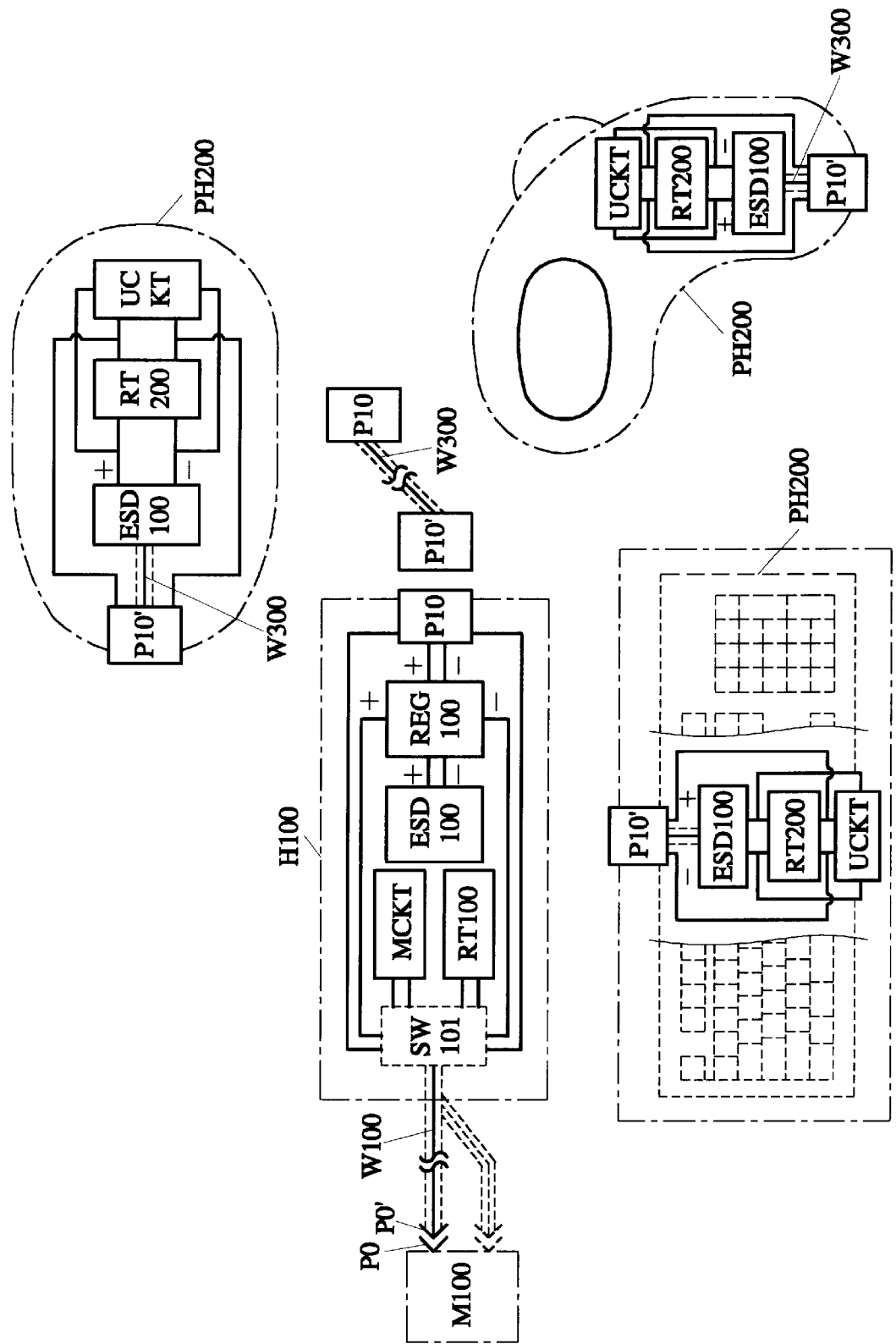
FIG. 5 is a schematic view showing a circuit of the present invention containing an additional wire provided to the interface connector (or the plug-socket unit) between the present invention and its matching peripheral for the transmission of electric energy and signal.

The electric energy transmission wire W200 in the multi-purpose radio T/R system as illustrated in FIG. 4 can be substituted with a signal and electric energy transmission wire W300 to incorporate both said interface connectors (or plug-socket units) P10 and P10' respectively provided in the integrated multi-purpose radio T/R system and its matching peripheral PH200 to execute transmission of electric energy and signals; or to incorporate between the interface connector (or plug-socket unit) P0 from the mainframe M100 and the interface connector (or plug-socket unit) P10' from the radio peripheral PH200 to execute electric energy or signal transmission. FIG. 5 shows a schematic view of a circuit with additional signal and electric energy transmission wire provided between the interface connectors (or plug-socket units) for signal and electric energy transmission for the multi-purpose radio T/R system in the preferred embodiment as illustrated in FIG. 4. Wherein, the transmission wire W100 and the interface connector (or plug-socket unit) P0' for transmission of signal or both of signal and electric energy are provided to the integrated multi-purpose radio T/R system H100 to connect the interface connector (or plug-socket unit) from the mainframe M100; the interface connector (or plug-socket unit) P0 is provided to the integrated multi-purpose radio T/R system for transmission of signal or both of signal and electric energy; the interface connector (or plug-socket unit) P10' is provided to the radio peripheral PH200 for transmission of signal or both of signal and electric energy; a wire W300 for transmission of signal and electric energy is provided between said interface connectors (or plug-socket units) P10 and P10' with both ends of said wire W300 provided with interface connectors (or plug-socket units) to respectively connect to the signal and electric energy transmission interface connector (or plug-socket unit) P10 from the integrated multi-purpose radio T/R system H100, and to the radio peripheral PH200 provided with the interface connector (or plug-socket unit) P10' for signal or both of signal and electric energy transmission; one of said interface connectors (or plug-socket units) may be omitted and one end of said signal and electric energy transmission wire W300 is directly connected to the integrated multi-purpose radio T/R system H100 or its matching radio peripheral PH200; said interface connector (or plug-socket unit) P10 or P10' is comprised of one or more than one connector (or plug-socket unit) of SERIAL, PS2, USB, IEEE1394 or any other selected specification; and the DC source from the mainframe M100 being subject to regulation and control by the charging control circuit REG100 provided inside the integrated multi-purpose radio T/R system H100, is further outputted to the radio peripheral PH200 via the electric energy and signal transmission wire W300, so to supply power to the radio peripheral PH200 and further to match charging voltage and amperage required by the (dis)chargeable battery ESD100, and to execute charging status display as required; or to incorporate between the interface connector (or plug-socket unit) P0 from the mainframe M100 and the interface connector (or plug-socket unit) from the radio peripheral PH200 to execute signal or electric energy transmission;

a charging control circuit REG100: comprised of charging related electro-mechanical electronic device, provided in the integrated multi-purpose radio T/R system H100, or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the integrated multi-purpose radio T/R system H100, or in the wired mouse, track ball, or touch panel to be combined with the multi-purpose radio T/R system; said (dis)chargeable battery ESD100 is also an optional device.

Figure 6:
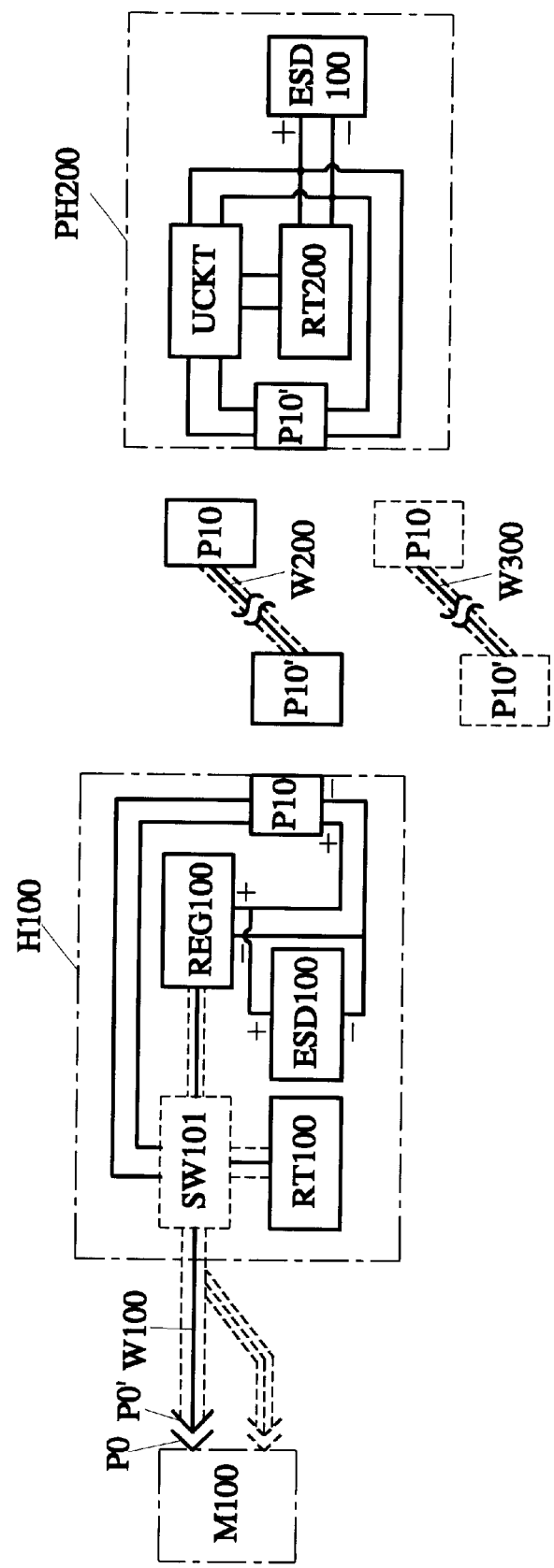
FIG. 6 is a schematic view showing a circuit of the present invention contain the interface connector (or the plug-socket unit) with the absence of wired mouse, track ball or touch panel.

Furthermore, additional to the interface connector (or plug-socket unit) P0' provided to the transmission wire W100 in the integrated multi-purpose radio T/R system H100 for coupling to the interface connector (or plug-socket unit) P0 from the mainframe M100, the wired mouse or track ball or touch panel related mechanisms and circuits MCKT can be omitted, and instead, the interface connector (or plug-socket unit) P10 is provided and a switch SW101 is provided depending on the nature of the circuit to connect to the interface connector (or plug-socket unit) P10 via the operation of the switch SW100 and the transmission wire W100 to the mainframe M100, or switched to the transmission wire W100 to the mainframe M100 to connect to the one-way radio reception or two-way radio T/R infrared, RF or ultrasonic transmission circuit RT100. As illustrated in FIG. 6, the wired mouse, track ball or touch panel is omitted and instead, interface connectors are provided to a circuit of the multi-purpose radio T/R system of the present invention. Wherein, the transmission wire W100 is provided to the integrated multi-purpose radio T/R system H100, the interface connector (or plug-socket unit) P0' is provided at the other end of the transmission wire W100 to connect to the interface connector (or plug-socket unit) P0 from the mainframe M100; the interface connector (or plug-socket unit) P10 is provided to the integrated multi-purpose radio T/R system H100; and depending on the nature of the circuit requirements, the optional switch SW101 may be provided for connection to the one-way radio reception or two-way radio T/R infrared, RT, or ultrasonic transmission circuit RT10 via the transmission wire W100 and the operation of the switch SW101, or for switching to connect to the interface connector (or plug-socket unit) P10; the interface connector (or plug-socket unit) P10' is provided to the radio peripheral PH200 so that when required, said interface connector (or plug-socket unit) P10' is connected to the interface connector (or plug-socket unit) P10 from the integrated multi-purpose radio T/R system H100 via the electric energy transmission wire W200 to execute signal and electric energy transmission between the integrated multi-purpose radio T/R system H100 and its matching radio peripheral PH200; or the signal and electric energy transmission wire W300 is used to incorporate said interface connectors (or plug-socket units) between the radio peripheral PH200 and the integrated multi-purpose radio T/R system H100 to execute signal and electric energy transmission; or to incorporate the interface connector (or plug-socket unit) PO from the mainframe M100 and the interface connector (or plug-socket unit) P10' from the radio peripheral to execute signal or electric energy transmission; said interface connector (or plug-socket unit) P10 or P10' is comprised of one or more than one interface connector of SERIAL, PS2, USB, IEEE1394 or any other selected specification; the DC source from the mainframe M100 supplied to the integrated multi-purpose radio T/R system H100 is subject to regulation and control by the charging control circuit REG100 before being outputted to the radio peripheral PH200 to match voltage and amperage required by the (dis)chargeable battery ESD100 and to execute the charging status display as required; when the integrated multi-purpose radio T/R H100 matching radio peripheral PH200 is executing radio operation, the one-way reception or two-way radio T/R infrared, RF or ultrasonic transmission circuit RT100 from the integrated multi-purpose radio T/R system H100 executes radio signal T/R to the mainframe M100; and when the radio peripheral PH200 is having its interface connector (or plug-socket unit) P10' connected to the interface connector (or plug-socket unit) P10 from the multi-purpose radio T/R system, the radio peripheral PH200 executes wired and directly connected signal transmission and reception of charging electric energy with the integrated multi-purpose radio T/R system H100;

a charging control circuit REG100: comprised of charging function related electromechanical electronic elements, provided in an integrated multi-purpose radio T/R system H100 or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device, and may be provided in the radio peripheral PH200 as elected;

a (dis)chargeable battery ESD100: comprised of a (dis)chargeable secondary battery or super capacitor, provided in the integrated multi-purpose radio T/R system H100, or in the wired mouse, track ball, or touch panel to be combined with the multi-purpose radio T/R system; said (dis)chargeable battery ESD100 is also an optional device.

Now referring to FIGS. 4, 5 and 6, additional to a conventional wired mouse, track ball or touch panel related mechanisms and circuits MCKT, a switch SW101 is provided for the transmission W100 to the mainframe M101 to connect to the interface connector (or plug-socket unit) P10, or for the transmission wire W100 to the mainframe M100 to connect to the one-way reception or two-way T/R infrared, RF, or ultrasonic radio transmission circuit RT100, or to the wired mouse, track ball or touch panel related mechanisms and circuits MCKT; and as an option, the charging control circuit REG100 or the (dis)chargeable battery ESD100 can be provided to indicate either combined or separated configuration with the radio T/R system H100''', and can be linked by means of an I/O interface connector (or plug-socket unit) P0' to combine both and facilitate portability and storage.

Figure 7:
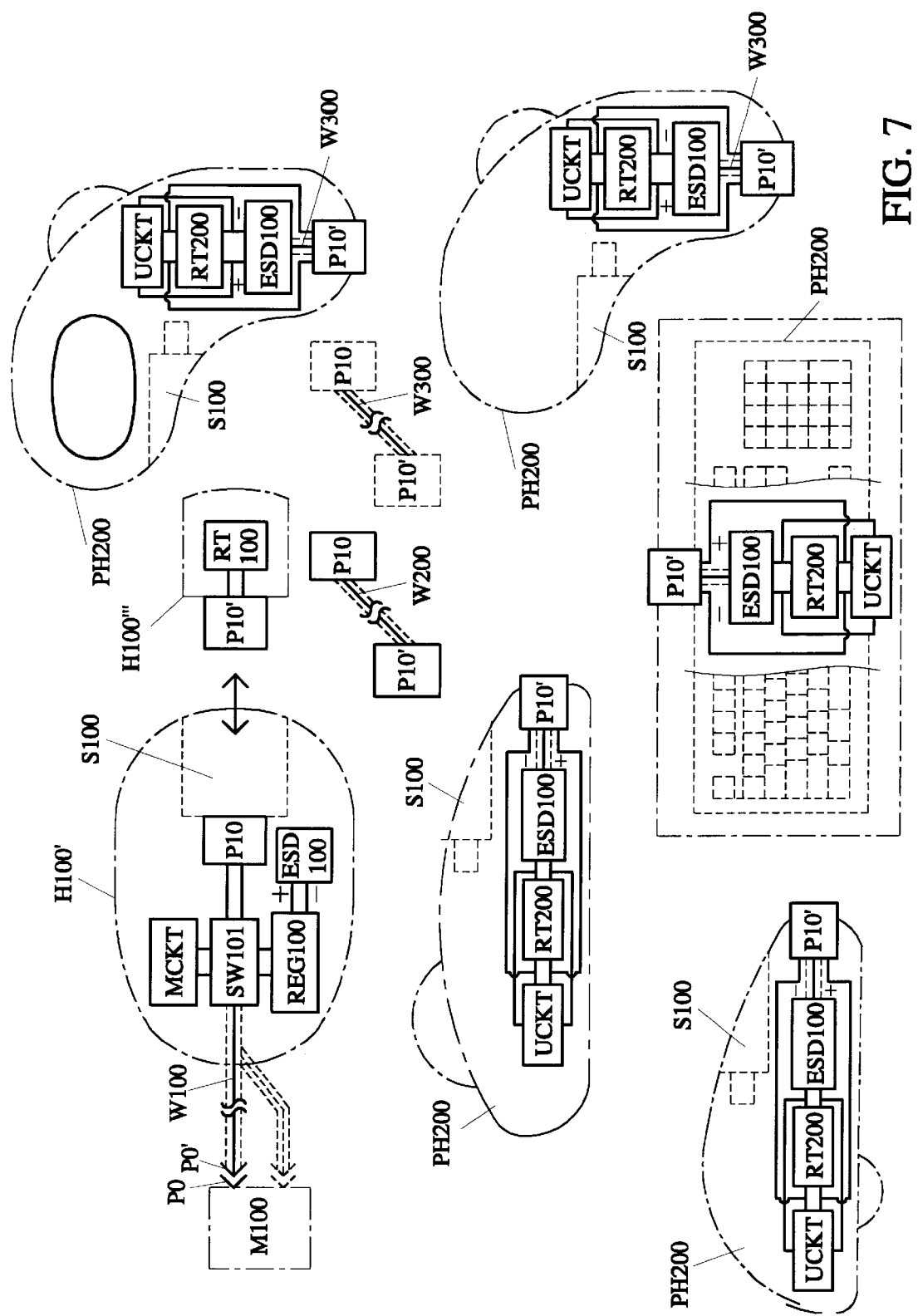
FIG. 7 is a schematic view of a first configuration of the present invention.

As illustrated in FIG. 7, a first configuration of a combined multi-purpose radio T/R system contains a wired mouse, track ball or touch panel provided with the charging control circuit REG100 and the (dis)chargeable batter ESD100 in a structure that can be connected and combined to a radio T/R H100''' via an interface connector (or plug-socket unit) of SERIAL, PS2, IEEE1394 or any other selected specification, thus to form the combined multi-purpose radio T/R system H100'; in addition to providing one-way radio reception of signals from the radio peripheral PH200 or to executing two-way signal T/R infrared, RF, or ultrasonic transmission, the radio T/R H100''' is capable of switching the source from the mainframe M100 to supply power via operation and control of the switch SW101 to the wired mouse, trackball or touch panel related mechanisms and circuits device MCKT, or supply power to the radio T/R system H100''', and to charge the inherited (dis)chargeable battery ESD100 via the charging control circuit REG100 provided in the wired mouse, track ball or touch panel; said radio T/R system H100''', in addition to combining with a combination socket S100 from the wired mouse, track ball or touch panel, can be removed for direct connection to the mainframe M100 to match the radio peripheral PH200 for operation, or as elected, the combination socket S100 is provided in the radio peripheral PH200 for connection to the radio T/R system H100''' to facilitate storage and portability; said combined multi-purpose radio T/R system H100' may be connected via the transmission wire W100, and the signal or both signal and electric energy transmission interface connector (or plug-socket unit) P0' for connection to the interface connector (or plug-socket unit) P0 from the mainframe M100; and as required, a signal or both signal and electric energy transmission interface connector (or plug-socket unit) P10 may be provided to the combined multi-purpose radio T/R system H100', and another signal or both signal and electric energy transmission interface connector (or plug-socket unit) P10' may be provided to the radio peripheral PH200, the (dis)chargeable battery ESD100 in the radio peripheral PH200 may be directly charged or indirectly charged through an electric energy transmission wire W200 may be provided between both said interface connectors (or plug-socket units)P10 and P10', or a signal and electric energy transmission wire W300 having at its both ends respectively provided with the interface connectors P10 and P10' for respectively connection to the signal and electric energy transmission interface connector (or plug-socket unit) P10 from the combined multi-purpose radio T/R system H100' and the radio peripheral PH200 provided with the interface connector (or plug-socket unit) P10', for signal transmission or both signal and electric energy transmission; or for incorporating between the interface connector (or plug-socket unit) P0 from the mainframe M100 and the interface connector (or plug-socket unit) P10' from the radio peripheral PH200 for electric energy or signal transmission; either set of said interface connectors may be omitted and having one end of the electric energy transmission wire W200 or signal and electric energy transmission wire W300 connected directly either to the combined multi-purpose radio T/R system H100' or to the radio peripheral PH200; said interface connector (or plug-socket unit) P10 or P10' is comprised of one or more than one connector (or plug-socket unit) of SERIAL, PS2, USB, IEEE1394 or any other selected specification and contain:

a charging control circuit REG100: comprised of charging related electro-mechanical electronic device, provided in the wired mouse, track ball or touch panel combined with the multi-purpose radio T/R system H100''', or in the wired mouse, track ball, or touch panel to be combined with the multi-purpose radio T/R system, so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the wired mouse, track ball, or touch panel to be combined with the multi-purpose radio T/R system H100'''; said (dis)chargeable battery ESD100 is also an optional device.

Figure 8:
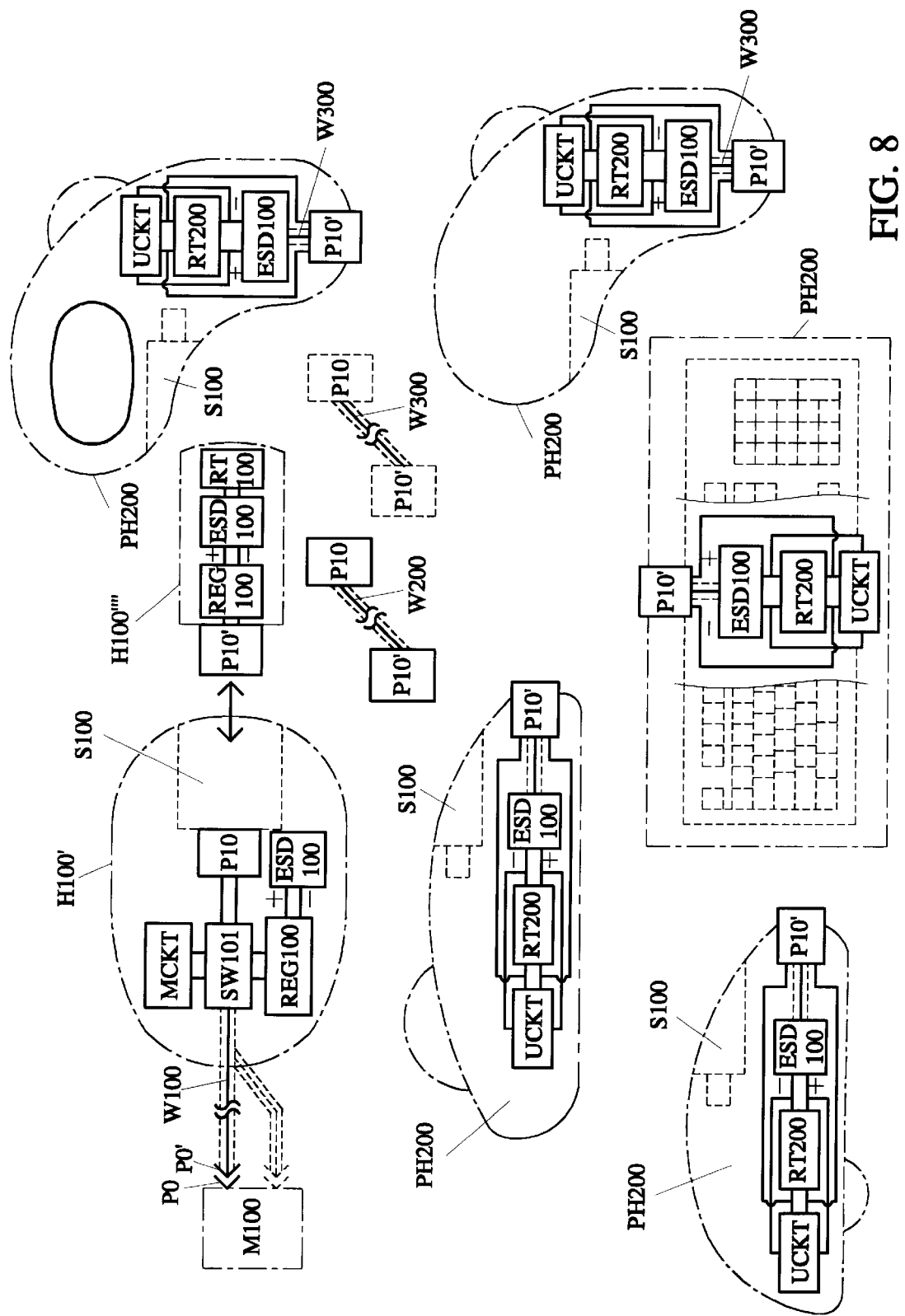
FIG. 8 is a schematic view of a second configuration of the present invention.

FIG. 8 shows a schematic view of a second configuration of a combined multi-purpose radio T/R system, contains a wired mouse, track ball or touch panel provided with the charging control circuit REG100 and the (dis)chargeable batter ESD100 in a structure that can be connected and combined to a radio T/R H100'''' via an interface connector (or plug-socket unit) of SERIAL, PS2, IEEE1394 or any other selected specification, thus to form the combined multi-purpose radio T/R system H100'; in addition to providing one-way radio reception of signals from the radio peripheral PH200 or to executing two-way signal T/R infrared, RF, or ultrasonic transmission, the radio T/R H100'''' is capable of switching the source from the mainframe M100 to supply power via operation and control of the switch SW101 to the wired mouse, track ball or touch panel related mechanisms and circuits device MCKT, or supply power to the radio T/R system H100'''', and to charge the inherited (dis)chargeable battery ESD101 via the charging control circuit REG100 provided in the wired mouse, track ball or touch panel; or to charge the inherited (dis)chargeable battery ESD100 through the charging control circuit REG100 provided in said radio T/R system H100''''; said radio T/R system H100'''', in addition to combining with a combination socket S100 from the wired mouse, trackball or touch panel, can be removed for direct connection to the mainframe M100 to match the radio peripheral PH200 for operation, or as elected, the combination socket S100 is provided in the radio peripheral PH200 for connection to the radio T/R system H100'''' to facilitate storage and portability; as elected, either the charging control circuit REG100 provided in the radio T/R system H100'''', or the charging control circuit REG100 provided in the wired mouse, track ball or touch panel maybe selected to operate and control the charging one or both (dis)chargeable batteries; said combined multi-purpose radio T/R system H100' may be connected via the transmission wire W100, and the signal or both signal and electric energy transmission interface connector (or plug-socket unit) P0' for connection to the interface connector (or plug-socket unit) P0 from the mainframe M100; and as required, a signal or both signal and electric energy transmission interface connector (or plug-socket unit) P10 may be provided to the combined multi-purpose radio T/R system H100', and another signal or both signal and electric energy transmission interface connector (or plug-socket unit) P10' may be provided to the radio peripheral PH200, the (dis)chargeable battery ESD100 in the radio peripheral PH200 may be directly charged or indirectly charged through an electric energy transmission wire W200 may be provided between both said interface connectors (or plug-socket units) P10 and P10', or a signal and electric energy transmission wire W300 having at its both ends respectively provided with the interface connectors P10 and P10' for respectively connection to the signal and electric energy transmission interface connector (or plug-socket unit) P10 from the combined multi-purpose radio T/R system H100' and the radio peripheral PH200 provided with the interface connector (or plug-socket unit) P10', for signal transmission or both signal and electric energy transmission; or for incorporating between the interface connector (or plug-socket unit) P0 from the mainframe M100 and the interface connector (or plug-socket unit) P10' from the radio peripheral PH200 for electric energy or signal transmission; either set of said interface connectors may be omitted and having one end of the electric energy transmission wire W200 or signal and electric energy transmission wire W300 connected directly either to the combined multi-purpose radio T/R system H100' or to the radio peripheral PH200; said interface connector (or plug-socket unit) P10 or P10' is comprised of one or more than one connector (or plug-socket unit) of SERIAL, PS2, USB, IEEE1394 or any other selected specification and contain:

a charging control circuit REG100 comprised of charging related electro-mechanical electronic device, provided in the radio T/R system H100''' containing the (dis)chargeable battery ESD100, or in the wired mouse, track ball or touch panel combined with the multi-purpose radio T/R system H100''', so to execute operation and control of charging voltage and amperage to the (dis)chargeable battery ESD100, and detection of charging saturation; said charging control circuit REG100 is an optional device;

a (dis)chargeable battery ESD100: comprised of a (dis)chargeable secondary battery or super capacitor, provided in the wired mouse, track ball, or touch panel to be combined with the multi-purpose radio T/R system H100'''; said (dis)chargeable battery ESD100 is also an optional device.

Figure 9:
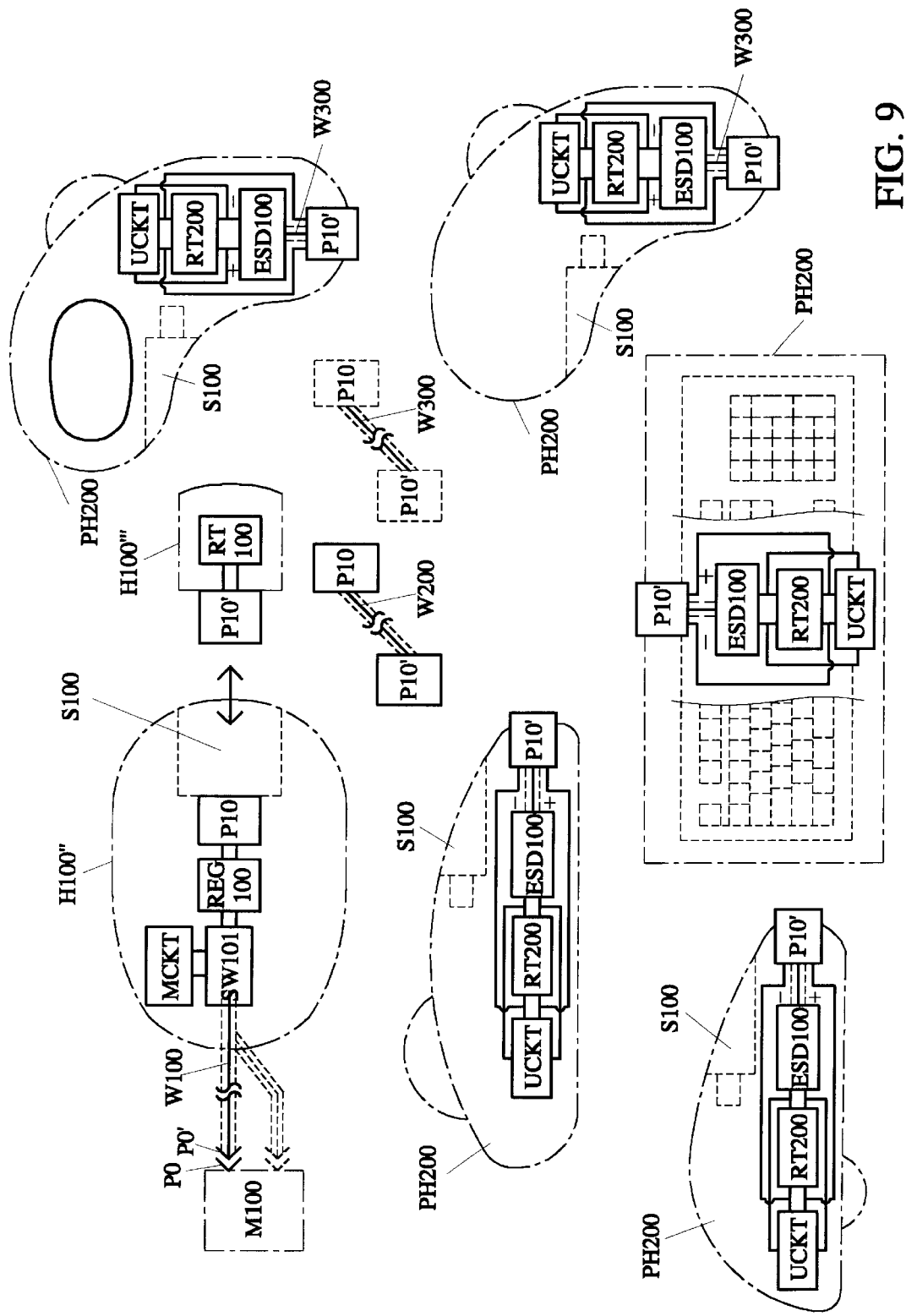
FIG. 9 is a schematic view of a third configuration of the present invention.

In a third configuration of a combined multi-purpose radio T/R system as illustrated in FIG. 9, it contains a wired mouse, track ball or touch panel to indicate a structure that can be connected and combined to a radio T/R system H10'''to form a combined multi-purpose radio T/R system H100'' by means of interface connector (or plug-socket unit) of SERIAL, PS2, USB, IEEE1394 or any other selected specification; in addition to providing one-way radio reception of signals from the radio peripheral PH200 or to executing two-way signal T/R infrared, RF, or ultrasonic transmission, the radio T/R H100''' is capable of switching the source from the mainframe M100 to supply power via operation and control of the switch SW101 to the wired mouse, trackball or touch panel related mechanisms and circuits device MCKT, or supply power to the radio T/R system H100''', and to charge the inherited (dis)chargeable battery ESD100 via the charging control circuit REG100 provided in the wired mouse, track ball or touch panel; said radio T/R system H100''', in addition to combining with a combination socket S100 from the wired mouse, track ball or touch panel, can be removed for direct connection to the mainframe M100 to match the radio peripheral PH200 for operation, or as elected, the combination socket S100 is provided in the radio peripheral PH200 for connection to the radio T/R system H100''' to facilitate storage and portability; said combined multi-purpose radio T/R system H100' may be connected via the transmission wire W100, and the signal or both signal and electric energy transmission interface connector (or plug-socket unit) P0' for connection to the interface connector (or plug-socket unit) P0 from the mainframe M100; and as required, a signal or both signal and electric energy transmission interface connector (or plug-socket unit) P10 may be provided to the combined multi-purpose radio T/R system H100'', and another signal or both signal and electric energy transmission interface connector (or plug-socket unit) P10' may be provided to the radio peripheral PH200, the (dis)chargeable battery ESD100 in the radio peripheral PH200 may be directly charged or indirectly charged through an electric energy transmission wire W200 may be provided between both said interface connectors (or plug-socket units) P10 and P10', or a signal and electric energy transmission wire W300 having at its both ends respectively provided with the interface connectors P10 and P10' for respectively connection to the signal and electric energy transmission interface connector (or plug-socket unit) P10 from the combined multi-purpose radio T/R system H100'' and the radio peripheral PH200 provided with the interface connector (or plug-socket unit) P10', for signal transmission or both signal and electric energy transmission; or for incorporating between the interface connector (or plug-socket unit) P0 from the mainframe M100 and the interface connector (or plug-socket unit) P10' from the radio peripheral PH200 for electric energy or signal transmission; either set of said interface connectors may be omitted and having one end of the electric energy transmission wire W200 or signal and electric energy transmission wire W300 connected directly either to the combined multi-purpose radio T/R system H100'' or to the radio peripheral PH200; said interface connector (or plug-socket unit) P10 or P10' is comprised of one or more than one connector (or plug-socket unit) of SERIAL, PS2, USB, IEEE1394 or any other selected specification.

Figure 10:
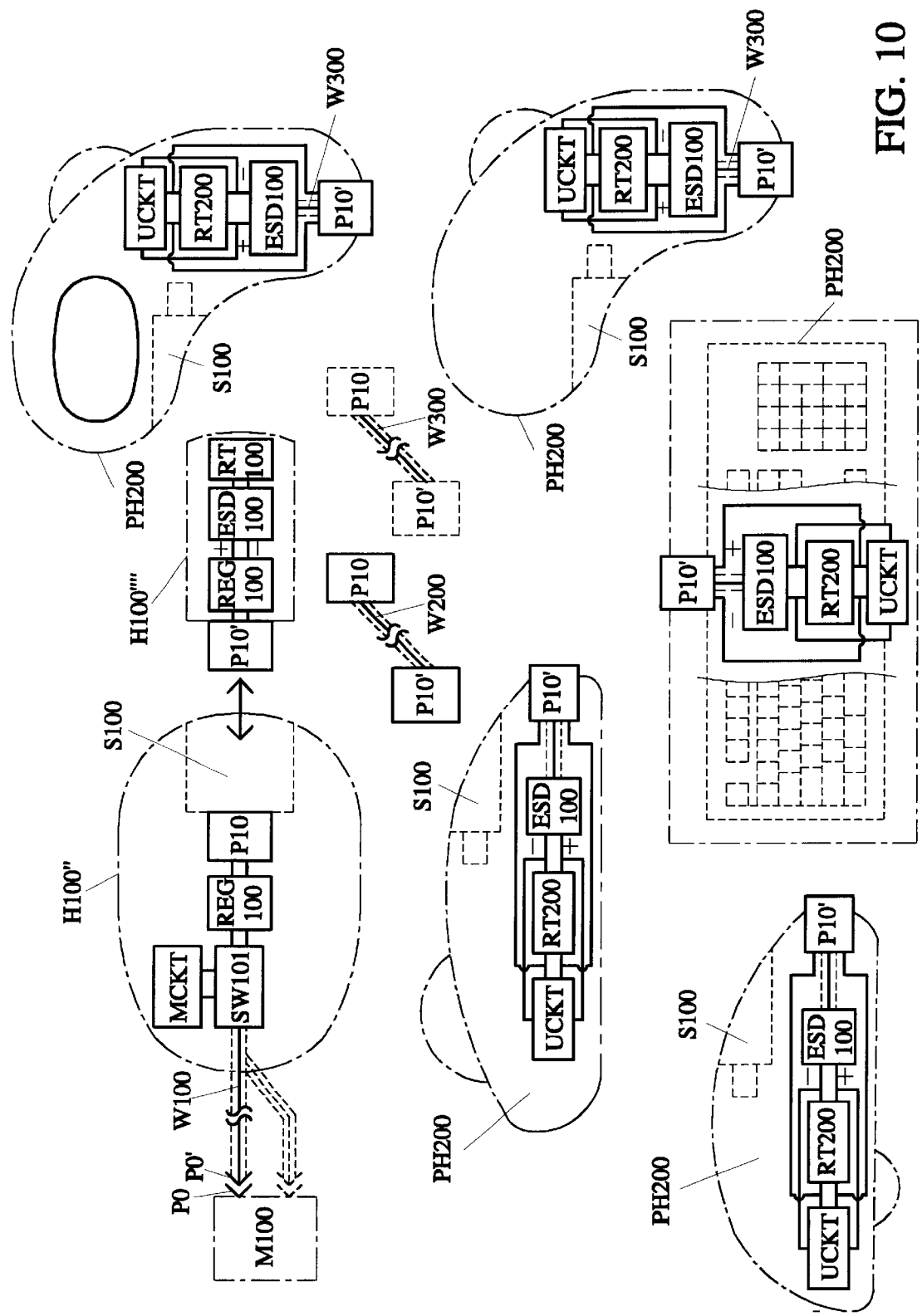
FIG. 10 is a schematic view of a fourth configuration of the present invention.

In a fourth configuration of a combined multi-purpose radio T/R system as illustrated in FIG. 10, it contains a wired mouse, track ball or touch panel to indicate a structure that can be connected and combined to a radio T/R system H10'''to form a combined multi-purpose radio T/R system H100'' by means of interface connector (or plug-socket unit) of SERIAL, PS2, USB, IEEE1394 or any other selected specification; in addition to providing one-way radio reception of signals from the radio peripheral PH200 or to executing two-way signal T/R infrared, RF, or ultrasonic transmission, the radio T/R H100''' is capable of switching the source from the mainframe M100 to supply power via operation and control of the switch SW101 to the wired mouse, trackball or touch panel related mechanisms and circuits device MCKT, or supply power to the radio T/R system H100''', and to charge the inherited (dis)chargeable battery ESD100 via the charging control circuit REG100 provided in the wired mouse, track ball or touch panel; said radio T/R system H100''', in addition to combining with a combination socket S100 from the wired mouse, trackball or touch panel, can be removed for direct connection to the mainframe M100 to match the radio peripheral PH200 for operation, or as elected, the combination socket S100 is provided in the radio peripheral PH200 for connection to the radio T/R system H100''' to facilitate storage and portability; said combined multi-purpose radio T/R system H100' may be connected via the transmission wire W100, and the signal or both signal and electric energy transmission interface connector (or plug-socket unit) P0' for connection to the interface connector (or plug-socket unit) P0 from the mainframe M100; and as required, a signal or both signal and electric energy transmission interface connector (or plug-socket unit) P10 may be provided to the combined multi-purpose radio T/R system H100'', and another signal or both signal and electric energy transmission interface connector (or plug-socket unit) P10' may be provided to the radio peripheral PH200, the (dis)chargeable battery ESD100 in the radio peripheral PH200 may be directly charged or indirectly charged through an electric energy transmission wire W200 may be provided between both said interface connectors (or plug-socket units) P10 and P10', or a signal and electric energy transmission wire W300 having at its both ends respectively provided with the interface connectors P10 and P10 for respectively connection to the signal and electric energy transmission interface connector (or plug-socket unit) P10 from the combined multi-purpose radio T/R system H100'' and the radio peripheral PH200 provided with the interface connector (or plug-socket unit) P10', for signal transmission or both signal and electric energy transmission; or for incorporating between the interface connector (or plug-socket unit) P0 from the mainframe M100 and the interface connector (or plug-socket unit) P10' from the radio peripheral PH200 for electric energy or signal transmission; either set of said interface connectors may be omitted and having one end of the electric energy transmission wire W200 or signal and electric energy transmission wire W300 connected directly either to the combined multi-purpose radio T/R system H100'' or to the radio peripheral PH200; said interface connector (or plug-socket unit) P10 or P10' is comprised of one or more than one connector (or plug-socket unit) of SERIAL, PS2, USB, IEEE1394 or any other selected specification; and the DC source from the mainframe M100 is subject to regulation and control by the charging control circuit REG100 provided in the radio T/R system H100'''' so to match voltage and amperage required by the (dis)chargeable battery ESD100 and to execute charging status display as required and contains:

- a charging control circuit REG100 comprised of charging related electro-mechanical electronic device, provided in the radio T/R system H100'''' containing the (dis)chargeable battery ESD100, or in the wired mouse, track ball or touch panel combined with the multi-purpose radio T/R system H100'''', so to execute operation and control of charging voltage and amperage to the (dis)chargeable battery ESD100, and detection of charging saturation; said charging control circuit REG100 is an optional device;
- a (dis)chargeable battery ESD100: comprised of a (dis)chargeable secondary battery or super capacitor, provided in the multi-purpose radio T/R system H100'''' to be combined with the wired mouse, track ball, or touch panel; said (dis)chargeable battery ESD100 is also an optional device.

The structure for said radio T/R systems H100''' and H100'''' to combine with the wired mouse, track ball, or touch panel, or with the radio peripheral includes:

(1) mechanism combination containing hooker hole, latching hole or slit insertion, and tenon;
(2) adhesion or magic tape;
(3) magnets
(4) linear, traction, chains, band for stringing combination;
(5) in serials with a knuckle structure; or
(6) any other types of structure for normal combination with the radio peripheral to facilitate storage and portability.

Furthermore, self-rewinding by means of a coil or by manual winding for storage of those wires as disclosed above can be provided or a structure to receive folded transmission wires maybe provided to facilitate the use and storage of transmission wire W100, electric energy transmission wire W200, signal and electric energy transmission wire W300.

As disclosed above, a radio T/R system of the present invention also functions as a wired mouse, track ball or touch panel, matches its radio peripheral by infrared, RF or ultrasonic transmission for converting to execute functions of a wired mouse, track ball or touch panel in case of insufficient power, power failure or channel interference, also multiple interface connectors (or plug-socket units) can be provided to connect to each other and to connect both said multi-purpose radio T/R system and its matching radio peripheral, or transmission wire is provided for electric energy or both signal and electric energy transmission to provide diversified, convenient and innovative structure. Therefore, the application is duly filed accordingly.

I claim:

1. A multi-purpose radio transmission/reception (T/R) system, essentially including multi-purpose transmission/reception (T/R) device (H100) comprised of an infrared or RF or ultrasonic radio transmission/reception circuit (RT100) incorporated with wired mouse, track ball, or touch panel related mechanisms and circuits to receive signals from radio peripheral (PH200) via infrared or RF, or super sonic one-way transmission, or executes basic function of having two-way T/R interaction with radio peripheral; said multi-purpose T/R device (H100) is equipped with radio peripheral (PH200) containing a radio keyboard, hand-held track ball, hand-held operator, radio mouse, or radio scanner, radio camera, radio audio-visual (AV) display, radio TV game operator, radio remote control (RC) or any other radio peripheral, and is essentially comprised of:

a mainframe (M100) containing a computer host, a monitor or notebook, or information electric home appliance or other electric appliance, provided with one or more than one interface connector or plug-socket unit (P0) to be coupled to one or more than one interface connector or plug-socket unit (P0') corresponding to a transmission wire (W100) from a multi-purpose T/R device (H100) for transmission of electric energy and signals; and said interface connector or plug-socket unit (P0 or P0') is comprised of SERIAL, PS2, USB, IEEE1394 or any other connector or plug-socket unit of selected specification;

a multi-purpose transmission/reception (T/R) device (H100) comprised of a manually operated wired mouse, track ball or touch panel related mechanisms and circuits, an infrared or RF or ultrasonic radio transmission/reception circuit (RT100) to execute one-way radio reception or two-way radio transmission/reception, an option switch (SW100) depending on the nature of the transmission interface to switch said multi-purpose T/R device (H100) to wired mouse, track ball, or touch panel related mechanisms and circuits to connect the transmission wire (W100), or to switch said multi-purpose T/R device (H100) to infrared, RF or ultrasonic transmission circuits (RT100) of one-way radio reception or two-way transmission/reception to connect the mainframe (M100) through the transmission wire (W100); said transmission wire (W100) can be comprised of conductive transmission wire or transmission wire blended with optical fiber for one or more than one interface connector or plug-socket unit (P0') to be coupled to one or more than one corresponding interface connector or plug-socket unit (P0) from the mainframe (M100); said infrared, RF or ultrasonic radio transmission/reception circuit (RT100) of one-way radio reception or two-way transmission/reception is to execute message transmission to the radio peripheral (PH200) via infrared, RF or ultrasonic, so to receive signals transmitted from one or more than one radio peripheral (PH200) of one type or more than one type, or to execute one-way or two-way transmission/reception to or from one or more than one radio peripheral (PH200) of one type or more than one type;

a charging control circuit (REG100) comprised of charging related electro-mechanical electronic device, provided in the multi-purpose T/R device (H100) comprised of a radio transmission/reception circuit (RT100) and related apparatus of the wired mouse, track ball, or touch panel, so to execute operation and control of charging voltage and amperage to a chargeable battery (ESD100) provided in multi-purpose T/R device (H100) directly or indirectly via battery holder: and optionally provide a charging saturation detection circuit as required;

the chargeable battery (ESD100) is comprised of a chargeable secondary battery or super capacitor, provided in the multi-purpose T/R device (H100) directly or indirectly via battery holder, said multi-purpose radio T/R device (H100) comprised of radio transmission/reception circuit (RT100) and related apparatus of the wired mouse, track ball, or touch panel;

said charging control circuit (REG100) or chargeable battery (ESD100) can be optionally provided in said multi-purpose T/R device (H100);

A radio peripheral (PH200) comprised of a radio peripheral to execute infrared RF or ultrasonic transmission; wherein power source being selectively provided by the chargeable battery (ESD100) besides using primary battery, the radio peripheral (PH200) containing interface circuit, one-way radio transmission or two-way radio transmission/reception infrared, RF or supersonic radio transmission/reception circuit (RT200); in addition to providing one-way radio transmission or two-way radio transmission/reception interaction, an additional optional interface connector (P10') may be provided to the radio peripheral (PH200) for connection to the interface connector (P10) of multi-purpose T/R device (H100) by a transmission wire to execute wired signal output or input/output, or electric energy transmission.

2. The multi-purpose radio transmission/reception (T/R) system as claimed in claim 1, essentially comprised of:

a multi-purpose T/R device (H100) also functioning as a wired mouse, track ball or touch panel, to match one or more than one radio peripheral (PH200) of desk-top or hand-held infrared, RF or supersonic radio transmission; said radio peripheral (PH200) contains a radio keyboard, hand-held track ball, hand-held operator, radio mouse, or radio scanner, radio camera, radio AV display, radio TV game operator, radio RC or any other radio peripheral.

3. The multi-purpose radio transmission/reception (T/R) system as claimed in claim 1, essentially comprised of a mainframe (M100), a multi-purpose T/R device (H100), a charging control circuit (REG100), the chargeable battery (ESD100), wherein, one or more than one electric energy and signal transmission interface connector or plug-socket unit (P10) is provided optionally in said multi-purpose T/R device (H100) as required for matching radio peripheral (PH200); said matched radio peripheral (PH200) has infrared, RF or ultrasonic radio transmission peripheral characterized by that an interface connector or plug-socket unit (P10') provided in the radio peripheral (PH200) for electric energy or both electric energy and signal transmission connects internally to the chargeable battery (ESD100) in radio peripheral (PH200) and externally coupled to another electric energy or both of electric energy and signal transmission interface connector or plug-socket unit (P10) provided in the multi-purpose radio transmission/reception (T/R) system depending on their corresponding polarities to execute transmission of electric energy; a DC source from the mainframe (M100) being subject to regulation and control by the charging control circuit (REG100) provided inside the multi-purpose T/R device (H100), is further connected by the electric energy or both of electric energy and signal transmission interface connectors (or plug-socket units) (P10 and P10') provided between said device (H100) and said peripheral (PH200), to output to the chargeable battery (ESD100) in the radio peripheral (PH200) for matching the voltage and amperage required by the matched chargeable battery (ESD100), and to optionally provide a charging status display circuit as required.

4. The multi-purpose radio transmission/reception (T/R) system as claimed in claim 1, wherein, an intermediate transmission wire (W200) is further provided between the electric energy transmission structures of said electric energy or both electric energy and signal transmission interface connectors or plug-socket units (P10 and P10') respectively provided in the multi-purpose T/R device (H100) and the radio peripheral (PH200) so that the radio peripheral (PH200) maintains its operation while the multi-purpose T/R device (H100) is executing electric energy transmission to the radio peripheral (PH200).

5. The multi-purpose radio transmission/reception (T/R) system as claimed in claim 1, essentially comprised of:

a DC source from the mainframe (M100) being subject to regulation and control by the charging control circuit (REG100) provided inside the multi-purpose T/R device (H100), is further connected by the electric energy or both of electric energy and signal transmission interface connectors or plug-socket units (P10 and P10') provided between said device (H100) and said peripheral (PH200), to output to the chargeable battery (ESD100) in the radio peripheral (PH200), for matching the voltage and amperage required by the matched chargeable battery (ESD100), and to optionally provide a charging status display circuit as required;

a charging control circuit (REG100) comprised of charging related electro-mechanical electronic device, provided in the multi-purpose T/R device (H100), or in wired mouse, track ball or touch panel to be combined with the multi-purpose T/R device (H100), so to execute operation and control of charging voltage and amperage to the chargeable battery (ESD100), and to optionally provided a charging saturation detection circuit as required;

the chargeable battery (ESD100) comprised of a chargeable secondary battery or super capacitor, is provided in the multi-purpose T/R device (H100) directly or via battery holder.

6. The multi-purpose radio transmission/reception (T/R) system as claimed in claim 5, wherein, the electric energy transmission wire (W200) in the multi-purpose T/R device (H100) is substitute with a signal and electric energy transmission wire (W300) to incorporate both said interface connectors or plug-socket units (P10 and P10') respectively provided in the multi-purpose T/R device (H100) and its matched peripheral (PH200) to execute transmission of electric energy and signals; or to incorporate between the interface connector or plug-socket unit (P0) from the mainframe (M100) and the interface connector or plug-socket unit (P10') from the radio peripheral (PH200) to execute electric energy or signal transmission.

7. The multi-purpose radio transmission/reception (T/R) system as claimed in claim 1, wherein, additional to the interface connector or plug-socket unit (P0') provided to the transmission wire (W100) in the multi-purpose T/R device (H100) for coupling to the interface connector or plug-socket unit (P0) from the mainframe (M100), the wired mouse or track ball or touch panel related mechanisms and circuits can be omitted, and instead, the interface connector or plug-socket unit (P10) is provided and a switch (SW101) is provided depending on the nature of the circuit to connect to the interface connector or plug-socket unit (P10) via the operation of the switch (SW100) and the transmission wire (W100) to the mainframe (M100), or switched to the transmission wire (W100) to the mainframe (M100) to connect to the one-way radio reception or two-way radio transmission/reception (T/R) infrared, RF or ultrasonic radio transmission/reception circuit (RT100).

8. The multi-purpose radio transmission/reception (T/R) system as claimed in claim 1, wherein, additional to a conventional wired mouse, track ball or touch panel related mechanisms and circuits, a switch (SW101) is provided for switching the transmission wire (W100) to the mainframe (M100) to connect to the interface connector or plug-socket unit (P10), or for switching the transmission wire (W100) to the mainframe (M100) to connect to the one-way reception or two-way transmission/reception (T/R) infrared, RF, or ultrasonic radio transmission/reception circuit (RT100), or to the wired mouse, track ball or touch panel related mechanisms and circuits, and as an option, the charging control circuit (REG100) and the chargeable battery (ESD100) can be optionally provided to be a combined structure: said radio peripheral (PH200) indicates either combined or separated configuration with the radio T/R device (H100''') and both can be linked by means of an input/output (I/O) interface connector or plug-socket unit (P0'), and further be combined together to facilitate portability and storage.

9. The multi-purpose radio transmission/reception (T/R) system as claimed in claim 8, wherein, a combined multi-purpose T/R device (H100'') contains a wired mouse, track ball or touch panel to indicate a structure that can be connected and combined to a independent radio T/R device (H100'''') having charging function to form a combined multi-purpose T/R device (H100'') by means of interface connector or plug-socket unit of SERIAL, PS2, USB, IEEE1394 or any other selected specification; in addition to providing one-way reception of signals from the radio peripheral (PH200) or to executing two-way signal transmission/reception infrared, RF, or ultrasonic transmission, the multi-purpose T/R device (H100'') is capable of switching the source from the mainframe (M100) to supply power via operation and control of the switch (SW101) to operate the wired mouse, track ball or touch panel related mechanisms and circuits, or supply power to the radio T/R device (H100''''), and to charge the chargeable battery (ESD100) via the charging control circuit (REG100); said radio T/R device (H100''''), in addition to combining with a combination socket (S100) from the wired mouse, track ball or touch panel, can be removed for direct connection to the mainframe (M100) to match the radio peripheral (PH200) for operation, or as elected, the combination socket (S100) is provided in the radio peripheral (PH200) for connection to the radio T/R device (H100'''') to facilitate storage and portability.

10. The multi-purpose radio transmission/reception (T/R) system as claimed in claim 8, wherein, the structure for said radio T/R devices (H100''' and H100'''') to combine with the wired mouse, track ball, or touch panel, or with the radio peripheral device by linear, traction, chains, band for stringing combination.

11. The multi-purpose radio transmission/reception (T/R) system as claimed in claim 8, wherein, the structure for said radio T/R devices (H100''' and H100'''') to combine with the wired mouse, track ball, or touch panel, or with the radio peripheral device by any other types of structure for normal combination with the radio peripheral to facilitate storage and portability.

12. The multi-purpose radio transmission/reception (T/R) system as claimed in claim 1, further comprised of combined multi-purpose transmission/reception (T/R) device (H100''); said combined multi-purpose T/R device (H100'') contains related mechanisms and circuits provided with the charging control circuit (REG100), the chargeable battery (ESD100), and a wired mouse, track ball or touch panel that can be connected or combined to a radio T/R device (H100''') having independent structure via an interface connector or plug-socket unit of SERIAL, PS2, USB, IEEE1394 or any other selected specification, in addition to providing one-way radio reception of signals from the radio peripheral (PH200) or to executing two-way signal T/R infrared, RF, or ultrasonic transmission, the combined multi-purpose T/R device (H100'') switched to connect the mainframe (M100) via operation and control of the switch (SW101) to operate the wired mouse, track ball or touch panel related mechanisms and circuits device, or connect to the radio T/R device (H100''') for the operations of radio transmission/reception with the radio peripheral (PH200), besides, it can charge the chargeable battery (ESD100) via the charging control circuit REG100 provided in the wired mouse, track ball or touch panel; said radio T/R device (H100''') in addition to combining with a combination socket (S100) from the wired mouse, track ball or touch panel, can be removed for direct connection to the mainframe (M100) to match the radio peripheral (PH200) for operation, or as elected, the combination socket (S100) is provided in the radio peripheral (PH200) for connection to the radio T/R device (H100) to facilitate storage and portability.

13. The multi-purpose radio transmission/reception (T/R) system as claimed in claim 1, wherein a combination socket (S100) from the wired mouse, track ball or touch panel, can be removed for direct connection to the mainframe (M100) to match the radio peripheral (PH200) for operation.

14. The multi-purpose radio transmission/reception (T/R) system as claimed in claim 1, further being a combined structure, wherein, said radio transmission/reception circuit (RT100) can independently comprise radio T/R device (H100''') so that said radio T/R device can be used separately or stored together with radio peripheral (PH200); said radio peripheral (PH200) includes at least one radio transmission/reception circuit (RT200) and power source for providing one-way or two-way radio transmission function with radio transmission/reception circuit (RT100) of radio T/R device (H100''') each other via infrared or RF, or ultrasonic.

15. The multi-purpose radio transmission/reception (T/R) system as claimed in claim 14, further including the charging control circuit (REG100) and the chargeable battery (ESD100) to construct the radio T/R device (H100'''') having charging function.

* * * * *